United States Patent [19]

Mir et al.

[11] Patent Number: 5,064,684

[45] Date of Patent: Nov. 12, 1991

[54] WAVEGUIDES, INTERFEROMETERS, AND METHODS OF THEIR FORMATION

[75] Inventors: Jose M. Mir, Webster; John A. Agostinelli, Rochester, both of N.Y.

[73] Assignee: Eastman Kodak Company, Rochester, N.Y.

[21] Appl. No.: 388,450

[22] Filed: Aug. 2, 1989

[51] Int. Cl.$^5$ .......................... B05D 3/06; B05D 5/12
[52] U.S. Cl. ........................................ 427/53.1; 427/75;
427/100; 427/126.3; 427/126.6; 427/162;
427/240; 427/271; 427/273; 427/282; 427/287;
427/370; 427/380; 427/384; 427/419.1;
427/419.2
[58] Field of Search .................. 427/53.1, 162, 273,
427/283, 75, 240, 380, 12, 48.1, 370, 287, 100,
126.6, 126.3, 271, 384, 343, 419.1, 419.2

[56] References Cited

U.S. PATENT DOCUMENTS

| | | | |
|---|---|---|---|
| 3,357,857 | 12/1967 | Provisor et al. | 437/232 |
| 3,653,991 | 4/1972 | Sirtl et al. | 148/178 |
| 3,783,009 | 1/1974 | Tramposch | 148/174 |
| 3,917,780 | 11/1975 | Mazdiyasni et al. | 264/61 |
| 3,941,647 | 3/1976 | Druminski | 156/612 |
| 3,944,950 | 3/1976 | Jacobs et al. | 333/31 R |
| 3,997,690 | 12/1976 | Chen | 427/162 |
| 3,998,523 | 12/1976 | Otomo | 350/150 |
| 4,053,207 | 10/1977 | Keve et al. | 350/150 |
| 4,201,450 | 5/1980 | Trapani | 350/150 |
| 4,219,866 | 8/1980 | Maher | 361/241 |
| 4,257,111 | 3/1981 | Soohoo et al. | 365/114 |
| 4,324,750 | 4/1982 | Maher | 264/67 |
| 4,352,116 | 9/1982 | Yariv et al. | 357/17 |
| 4,384,038 | 5/1983 | Khoe et al. | 430/321 |
| 4,391,901 | 7/1983 | Land et al. | 430/455 |
| 4,437,139 | 3/1984 | Howard | 361/313 |
| 4,438,447 | 3/1984 | Copeland et al. | 357/91 |
| 4,514,250 | 4/1985 | Hwang | 156/610 |
| 4,639,329 | 1/1987 | Makishima et al. | 252/501.1 |
| 4,715,680 | 12/1987 | Kawaguchi et al. | 350/96.34 |
| 4,952,556 | 8/1990 | Mankse | 427/53.1 |

FOREIGN PATENT DOCUMENTS

| | | |
|---|---|---|
| 0290357 | 11/1988 | European Pat. Off. . |
| 54-002659 | 1/1979 | Japan . |
| 54-033107 | 10/1979 | Japan . |
| 55-015162 | 2/1980 | Japan . |
| 55-024413 | 2/1980 | Japan . |
| 59-025901 | 2/1984 | Japan . |
| 59-027402 | 2/1984 | Japan . |
| 59-087411 | 5/1984 | Japan . |
| 59-213666 | 12/1984 | Japan . |
| 1319559 | 6/1973 | United Kingdom . |
| 1319560 | 6/1973 | United Kingdom . |
| 84/03155 | 8/1984 | World Int. Prop. O. . |

OTHER PUBLICATIONS

Kawaguchi et al., Applied Optics, vol. 23, No. 13, Jul. 1984, pp. 2187–2191.

Fukashima et al., "Preparation of Ferroelectric PLT Films by Thermal Decomposition of Organometallic Compounds", pp. 595–598.

Lee et al., Optical Engineering, vol. 25, No. 2, Feb. 1986, pp. 250–260.

Skeath et al., Appl. Phys. Letr., 49(19), Nov. 1986, pp. 1221–1223.

Budd, K. D., "Sol-Gel Processing of PbTiO$_3$, PbZrO$_3$, PZT, PLZT Thin Films", Brit. Cer. Proc., vol. 36 (1985), pp. 17,24 and Abstract.

Primary Examiner—Janyce Bell
Attorney, Agent, or Firm—Paul A. Leipold

[57] ABSTRACT

The invention generally is accomplished by a casting of a liquid metallo-organic ceramic precursor solution to form a layer on a substrate. This layer is then heated to a low temperature to create an amorphous layer. Then a selected area is heated to a high temperature by localized heating to create a patterned area of polycrystalline ceramic having electro-optic properties.

51 Claims, 5 Drawing Sheets

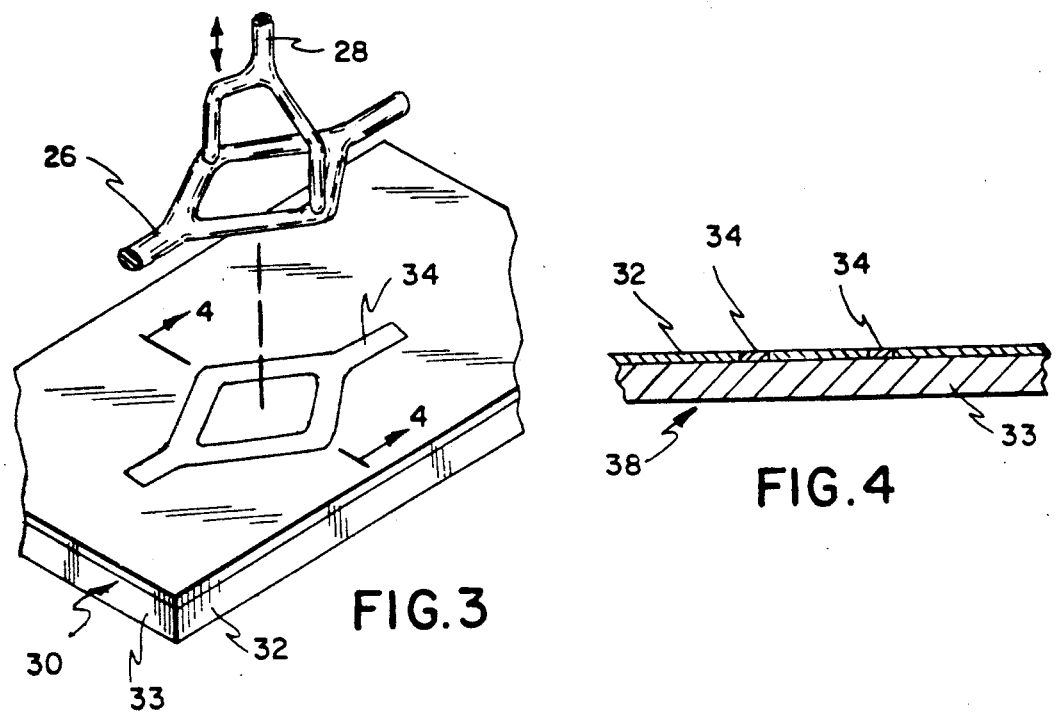
FIG. 3
FIG. 4
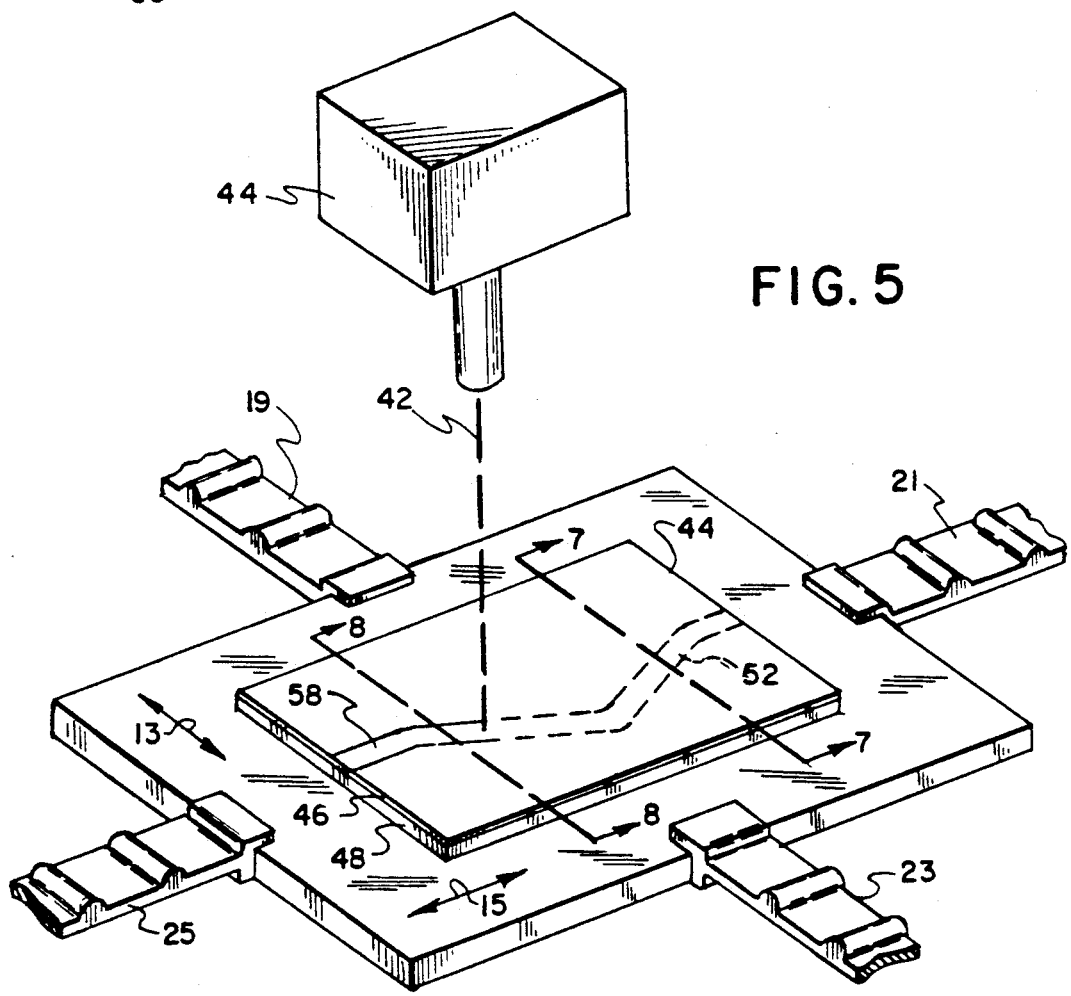
FIG. 5

WAVEGUIDES, INTERFEROMETERS, AND METHODS OF THEIR FORMATION

FIELD OF THE INVENTION

This invention relates to electro-optic waveguides, interferometers, and methods of their formation. It particularly relates to methods of forming ceramic metallo-organic thin films that are channel or relief waveguides.

PRIOR ART

Electro-optic materials have been known in the art. Generally the methods of forming these materials have been by typical single crystal growth techniques, ceramic poweder, shaping and processing, or sputter coating of the materials onto a substrate.

U.S. Pat. No. 4,438,447—Copeland III et al discloses an electro-optic integrated circuit. U.S. Pat. No. 3,944,950—Jacobs et al discloses an optical waveguide material used in an integrated circuit. U.S. Pat. No. 4,053,207—Keve et al discloses an electro-optic device having a platelet of PLZT.

U.S. Pat. No. 3,998,523—Otomoto discloses a lanthanum-modified lead zirconate titanate electro-optic ceramic material formed by hot pressing techniques.

U.S. Pat. No. 4,437,139—Howard discloses lanthanum-modified lead zirconate titanates that are used in capacitors.

U.S. Pat. No. 4,715,680—Kawaguchi et al discloses an optical switch formed from an electro-optical material that may be formed of lead lanthanum zirconate titanate.

While electro-optical materials have been known, there is a need for an improved method of formation that is accurate, convenient, and low in cost.

THE INVENTION

In accordance with the invention metallo-organic techniques are utilized to form layers that are selectively converted to electro-optical materials and waveguide materials. In accordance with the method of the invention an electro-optic waveguide is formed by casting a metallo-organic ceramic precursor solution to form a layer on a substrate. The layer is then heated so as to decompose the metallo-organic materials, drive off volatile materials, and create a substantially inorganic material layer. Subsequent to this a high temperature localized heating is applied to create a patterned area of polycrystaline ceramic having electro-optic properties. Hight temperature localized heating may be carried out utilizing a laser or heated imprinting tool.

In another variation of the invention the metallo-organic material that is cast on the substrate is not capable of forming an electro-optical material. Portions of the film may be converted to an electro-optic material by a process of reactive in-diffusion from a selectively applied surface film. Alternatively, the source for the reactive in-diffusion may come from the vapor phase, with the selective conversion achieved through a diffusion mask. The use of a dielectric layer between the substrate and of electro-optic waveguide and the formation of interferometers are also disclosed.

MODES OF PRACTICING THE INVENTION

The invention generally is accomplished by forming an electro-optic waveguide by casting a layer of metallo-organic ceramic precursor onto a substrate and performing a localized modification of a portion of said layer to create a patterned area of electro-optic polycrystalline ceramic. In a preferred embodiment, the layer is low temperature heated to create an amorphous substantially inorganic film prior to localized modification by high temperature heating in a pattern with a laser.

BRIEF DESCRIPTIONS OF THE DRAWINGS

FIG. 3 is a perspective partial view of apparatus for performing another embodiment of the invention.

FIG. 4 is a cross-sectional view of the waveguide of FIG. 3 on cross section line 4—4.

FIG. 5 is a partial perspective view of apparatus for performing the process of another embodiment of the invention.

Figure 6:
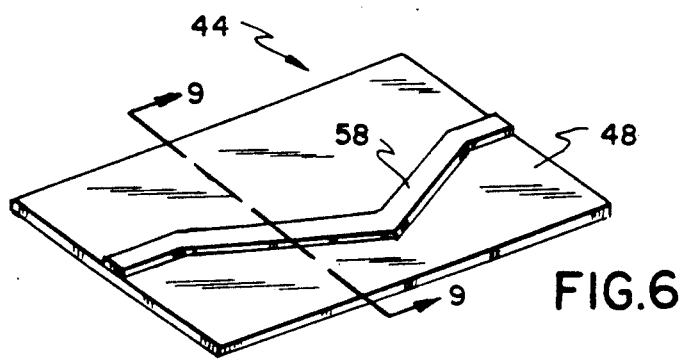
FIG. 6 is a perspective view of a relief waveguide in accordance with the invention.
Figure 7:
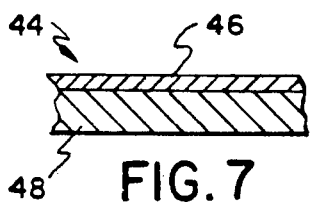
Figure 8:
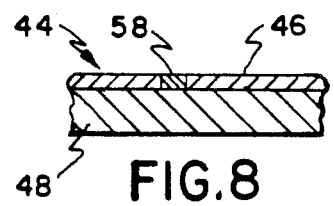
Figure 9:
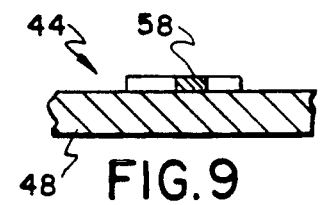

FIGS. 7, 8, and 9 are cross-sectional views on lines 7—7, 8—8, and 9—9 of FIGS. 5 and 6.

Figure 10:
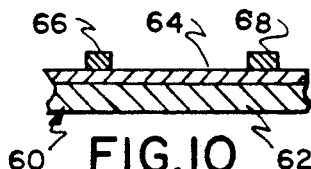
Figure 11:
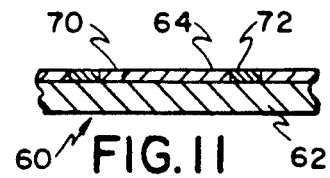

FIGS. 10 and 11 illustrate in cross section the formation of waveguides by another embodiment of the invention.

FIGS. 12, 13, 14, and 15 illustrate an embodiment of the invention utilizing masking and in-diffusion of a material.

Figure 16:
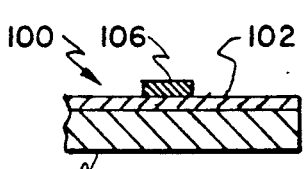
Figure 17:
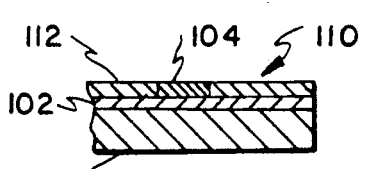

FIGS. 16 and 17 illustrate waveguides of the invention in which a insulating layer has been formed between the substrate and the optic waveguide.

Figure 18:
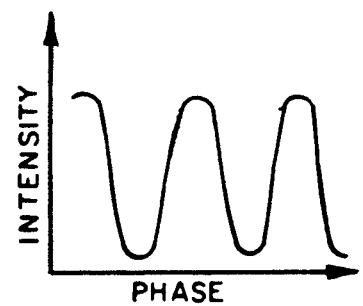

FIG. 18 represents the intensity versus phase difference of beams in a Mach-Zehnder-type interferometer.

Figure 19:
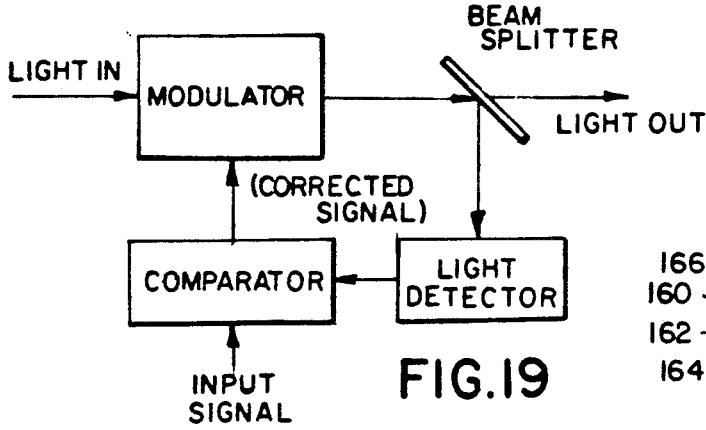

FIG. 19 represents a block diagram of a feedback system for a Mach-Zehnder-type interferometer.

Figure 20:
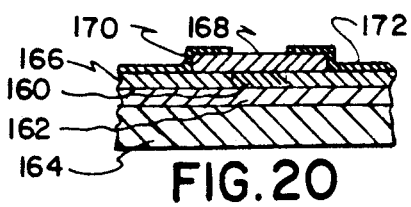

FIG. 20 is a cross-sectional view of an electro-optical waveguide in the area of electrode attachment.

Figure 21:
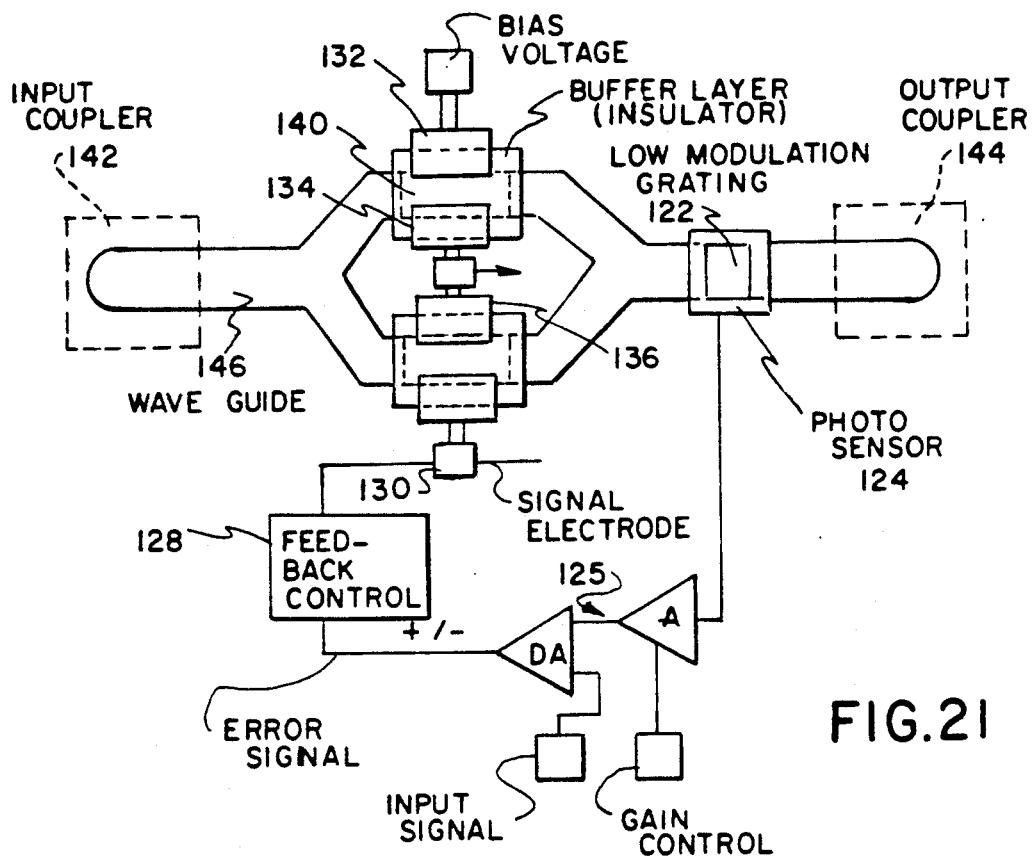
Figure 22:
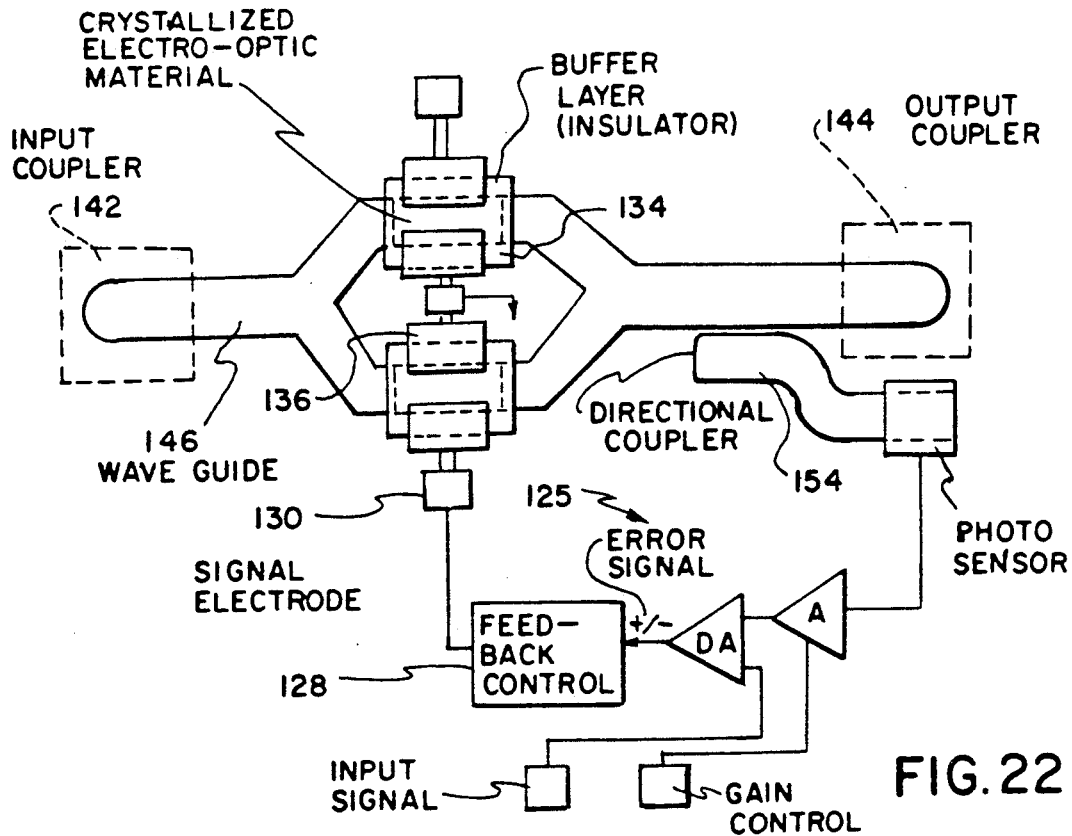

FIGS. 21 and 22 illustrate Mach-Zehnder-type interferometers in a schematic view.

Figure 23:
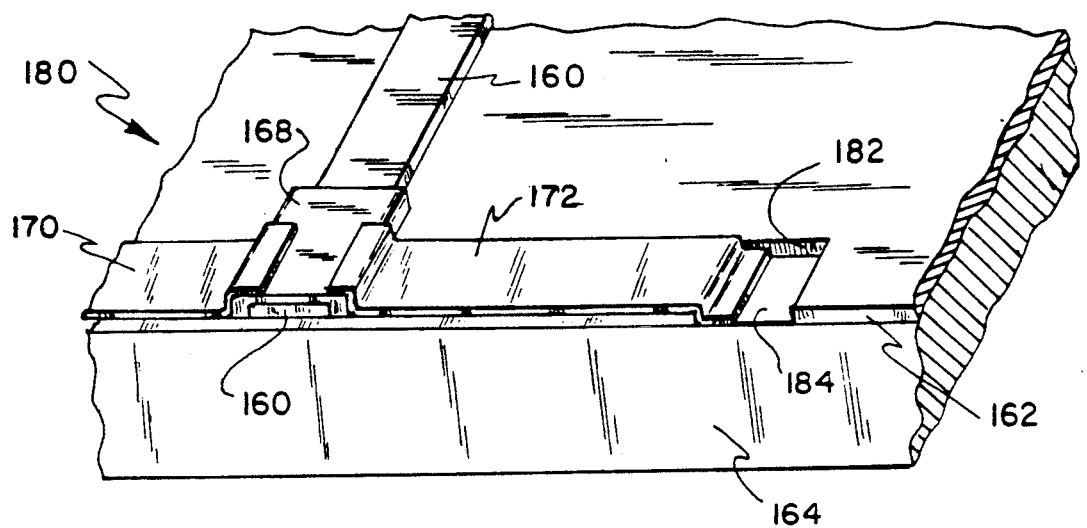

FIG. 23 is a partial perspective view of the electric attachment area of a Mach-Zehnder-type interferometer in the area of electrode attachment to a rib waveguide.

Figure 24:
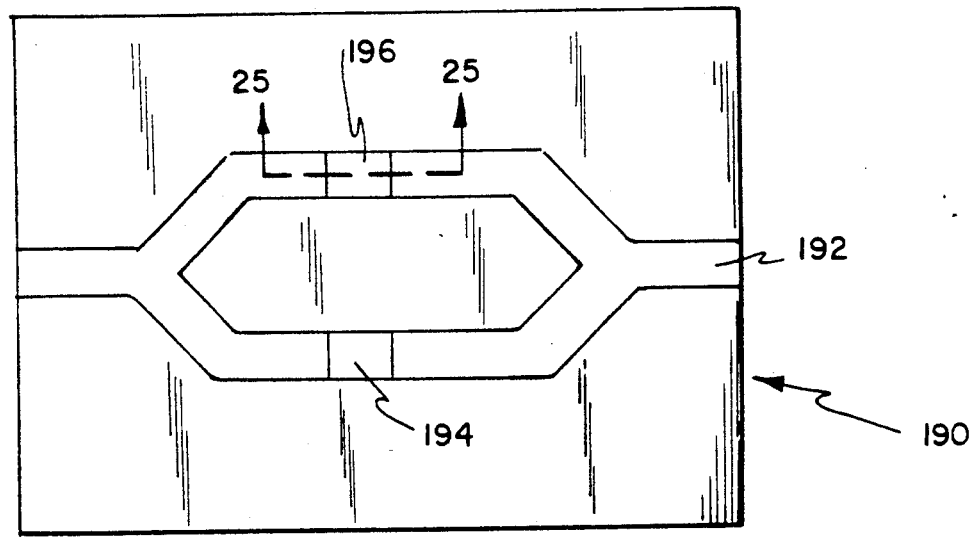

FIG. 24 is a plan view of a Mach-Zehnder-type interferometer in which only a small area of the optic waveguide area is an electro-optic waveguide.

Figure 25:
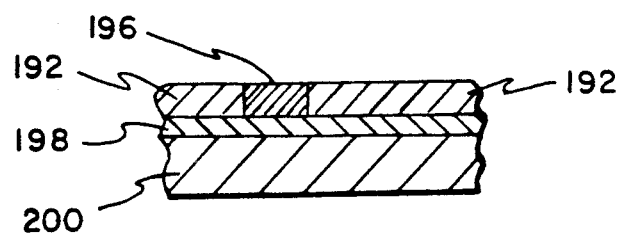

FIG. 25 is a cross section on line 25—25 of FIG. 24 taken at the area of the electro-optic waveguide.

MODES OF PERFORMING THE INVENTION

The invention has numerous advantages over prior processes in that it allows the accurate low cost formation of electro-optic structures containing controlled areas of electro-optic crystalline material. The electro-optic patterns are useful as optical waveguides or grating structures for input/output coupling. The patterning available by the invention provides a fully programmable and direct method of defining waveguide structures. These and other advantages of the invention will be apparent from the detailed description below.

Figure 1:
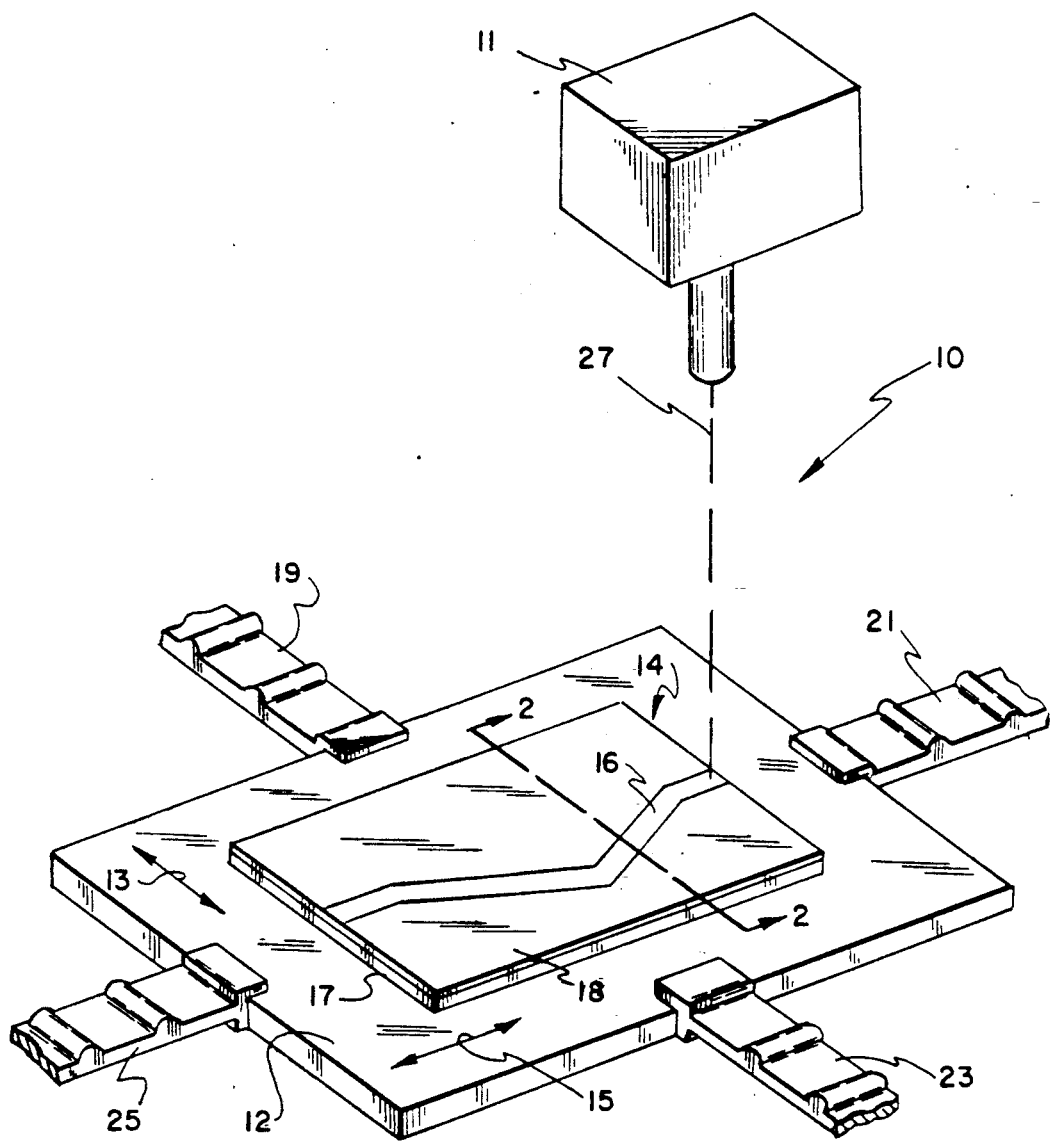
FIG. 1 is a perspective view of the apparatus and process for forming the waveguides of the invention.
Figure 2:
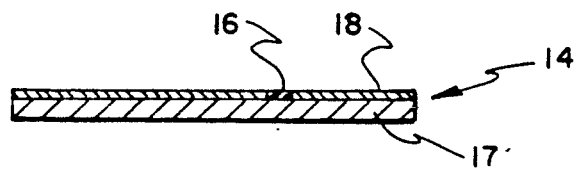
FIG. 2 is a cross-sectional view on cross section line 2—2 of FIG. 1.

FIG. 1 illustrates schematically and in perspective the process and apparatus 10 for carrying out an embodiment of the invention. As illustrated, a laser 11 is utilized to treat the substrate 14 onto which an electro-optic path 16 is to be formed. The substrate 14 rests on a table 12 that may be moved in directions as indicated to arrows 13 and 15. Griping means 19, 21, 23 and 25 control movement by a controller (not shown) that can move the table 12 in any desired direction to create any pattern of laser 11 onto substrate 14. The substrate 14 is composed of a high temperature base material 17, such as crystalline aluminum oxide (sapphire). Onto the base is coated a metallo-organic layer. The metallo-organic layer is heated prior to laser treatment to a temperature high enough to drive out organic materials and create substantially an amorphous inorganic layer 18. The substrate 14 is passed beneath laser 10. As the substrate 14 passes beneath laser 10, the path of laser beam 27 is moved by movement of table 12 to create the pattern of the electro-optic waveguide 16. As illustrated in the cross-sectional view of FIG. 2, the substrate 14 after heating by the laser beam 27 of laser 11 is comprised of an electro-optic portion 16 the low temperature formed substantially inorganic material 18 and the base 17. The electro-optic material typically is a lanthanum-modified lead zirconate titanate.

FIGS. 3 and 4 illustrate another system of the invention for forming electro-optical waveguide materials. This system uses an imprinting tool. As illustrated, the heated member 26 guided by control means (not shown) for control arm 28 is utilized to heat and convert amorphous ceramic material to the high index, or crystalline electro-optic material. The substrate 30 is composed of an electro-optic precursor material 32 and a high temperature base 33 such as aluminum oxide. The electro-optic precursor material 32 is formed from metallo-organic precursor solution that is cast onto the high temperature base 33 and heated to a low temperature to drive out the organic materials. Then the imprinting tool 26 is heated to a temperature sufficient to convert material 32 into a high index, crystalline, electro-optic material and brought against the precursor material 32 to form a pattern of the imprinting tool. As illustrated, the pattern of electro-optic material 34 bears the same shape as the heating element 26. The cross-sectional view of FIG. 4 taken on cross-sectional line 44 of FIG. 3 illustrates that the area contacted by the imprinting tool 26 has been converted to an electro-optical material 34.

FIGS. 5, 6, 7, 8, and 9 illustrate a process of the invention where a rib electro-optic waveguide is formed. As illustrated in FIG. 5, the laser 40 directs laser beam 42 toward the substrate 44. The substrate 44 is composed of an electro-optic precursor 46 and a base layer 48. The table 12 is moved by means discussed above in the description of FIG. 1 in such a manner to create the laser heated path 52 as the substrate 44 moves. The area 58 that has been exposed to laser beam 42 has been heated and changed to an electro-optic waveguide. As illustrated in the cross-sectional view of FIG. 7, the structure formed is composed of a uniform electro-optic precursor material 46 and the base layer 48. The cross section of FIG. 8 taken on line 8—8 of FIG. 5 illustrates the electro-optic area 58 that is formed by exposure to the laser. The perspective view of FIG. 6 illustrates the substrate 44 after the non electro-optical material has been removed. Material 58 forms a rib waveguide on the base layer 48. As illustrated in FIG. 9 which is the cross section taken on line 9—9 of FIG. 6, the waveguide 58 is on the surface of base material 48. Alternatively, the laser may convert the precursor-film to a substantially inorganic insoluble amorphous film. Pattern development then would be created by washing off the nonlaser-treated areas with a solvent or acid. In this case a heat treatment would follow the pattern development in order to create the electro-optic phase.

FIGS. 10 and 11 illustrate an in-diffusion process. The member 60 is composed of a base 62 that has been covered with a nonelectro-optic ceramic precursor material 64. The deposits 66 and 68 represent materials that, when combined with precursor material 64, will produce electro-optic materials. A nonelectro-optic ceramic precursor material 64 could be a material such as an oxide glass of lanthanum zirconium and titanium with the materials for in-diffusion 66 and 68 being lead. The substrate 60 appearing in the cross section of FIG. 10 is heated to result in the finished member that is composed of the nonelectro-optic ceramic material 64 and electro-optical materials 70 and 72 on base 62.

Figure 12:
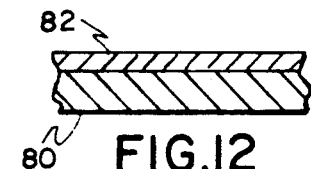
Figure 13:
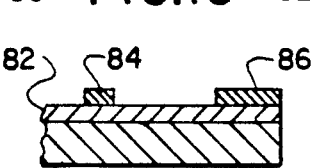
Figure 14:
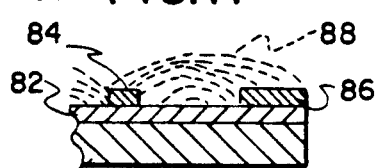
Figure 15:
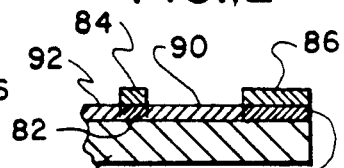

FIGS. 12 through 15 illustrate a gaseous diffusion process for formation of electro-optic materials. The process is illustrated by the cross-sectional views of FIGS. 12 through 15. In FIG. 12 is illustrated a base material 80 having thereon nonelectro-optic precursor material 82 such as oxide glass of zirconium titanium. As illustrated in FIG. 13, over layer 82 have been added areas 84 and 86 of a suitable diffusion barrier material such as silicon nitride. FIG. 14 illustrates the treatment of the electro-optic precursor 82 with a vapor 88 that is unable to penetrate the barrier areas 84 and 86. In the case of a zirconia titania layer 82 the vapor treatment material 88 could be a lead oxide to form lead zirconate titanate. FIG. 15 illustrates that after vapor treatment there are formed electro-optic areas 90 and 92 in the areas not masked by the diffusion members 84 and 86.

FIGS. 16 and 17 illustrate other embodiments of elements formed by the invention. These elements 100 and 110 differ in that they have an insulating dielectric layer 102 separating the channel electro-optic waveguide 104 of element 110 and the rib waveguide 106 of element 100 from the base member 108. Material 112 is material not converted by a high temperature heating to electro-optic material. The base 108 may be conductive when the dielectric layer is utilized.

The materials that may be utilized for formation of electro-optic materials in accordance with the invention are any electro-optic materials that may be formed by metallo-organic coating techniques. Suitable are such metallic oxide materials as lead zirconate titanate (PZT), lanthanum-modified lead zirconate titanate (PLZT), lead lanthanum titanate (PLT), barium lanthanum niobium titanate (BLTN), $BaTiO_3$, $LiTaO_3$, and $LiNbO_3$ where P is lead, L is lanthanum, T is titanium, B is barium, N is niobium, and Z is zirconium. Particularly preferred has been found to be the PLZT, LiNbO$_3$, and LiTaO$_3$ materials, as they have good electro-optic properties.

The substrate onto which the electro-optic material is placed may be any suitable material that has properties that do not interfere with the formation or performance of the electro-optic material. Suitable are sapphire (aluminum oxide), magnesium oxide, strontium titanate, silicon, silicon nitride on a silicon substrate, and silicon nitride on a gallium arsenide substrate. A particularly preferred material is sapphire, as it has good high temperature properties and is generally compatible with the electro-optical material utilized in formation of the electro-optic layers. In addition, sapphire has been shown to encourage the formation of highly oriented electro-optical crystalline films. Very strong crystalline orientation is a highly desirable property for those electro-optic materials having non centro-symmetric crystal structures.

Materials suitable for the dielectric layer may be any material that is compatible with the base material on which the electro-optic material is formed, as well as being compatible with the electro-optic material. Suitable dielectric materials are $Si_3N_4$, $SiO_2$, and $Ta_2O_3$. A preferred material is silicon nitride, as it is compatible with the electro-optic materials as well as having good dielectric properties.

In those embodiments of the invention where reactive in-diffusion of a material into a precursor for an electro-optic material is utilized to form the electro-optic area any precursor and in-diffusion reactant that when combined result in an electro-optic material may be utilized. The in-diffusing specie is usually a constituent of the material made. That is for PZT, the film could be Zr-Ti-oxides and the in-diffusing specie could be Pb.

Preferred is lanthanum zirconium titanium oxide glass as the precursor material with lead oxide as the diffusing reactant material either as a gas or solid layer prior to in-diffusion.

In the formation of the rib waveguides the material that is the precursor for the electro-optic rib waveguide may be removed after patterning by redissolving the metallo-organic precursor in the solvent utilized in application of the layer. Alternatively other solvents may be utilized. The films could be partially heated to produce the inorganic phase, treated further in a pattern by means such as a laser. The partially heated areas may be dissolved with an etchant such as acid.

The embodiment utilizing laser heating may utilize any suitable laser and focusing device to heat the area to be converted to an electro-optic waveguide to temperature required for the electro-optic material formation. It is noted that the heating may actually involve heating of the substrate with transfer of heat to the electro-optic precursor material. The electro-optic precursor material may be transparent to the laser and, therefore, require heating of the base material. It is also possible that the base could be transparent and that heating could be carried out by a laser passing through the base. While illustrated with movement of the table holding a material to be treated, it is also possible that the laser beam could be directed using a laser beam deflector to move the contact point of the laser beam upon the material to be heated. Such a method may be preferred, as it may be easier to move mirrors or deflectors than the table holding the substrate to be treated.

The process of the invention is formed with casting of the metallo-organic electro-optic precursor material onto a preformed substrate. The metallo-organic precursors may be formed by known methods such as described in European Patent No. 0 290 357. Examples that follow disclose preferred solvents and metallo-organic precursors for electro-optic precursor materials. The electro-optic materials may be formed by spin coating, casting, doctor blade coating, dip coating, spray coating, or other known methods of forming hardenable or curable liquid materials.

In the following is described an exemplary device which may be formed utilizing the techniques and articles of the invention. This device should function to provide a fully integrated, well-controlled analog light modulator. Applications of electro-optic waveguides formed by the invention may be in the area of measurement, laser printing, communication, or whenever a well-regulated analog modulator is required. The light output of the device would faithfully represent an input analog of voltage provided to the device.

The modulators of FIGS. 21 and 22 are based on a Mach-Zehnder-type interferometer. In this device, a light beam is coupled into a single-mode waveguide using a grating coupler, coupling prism, or butt coupling (well-known techniques in integrated optics). A branched waveguide divides the light into two equal beams that travel through two different waveguides. By applying an electric field to one or both of the waveguides, a refractive index change can be induced, resulting in a phase difference between the two coupled beams. The beams are brought together and caused to interfere. Depending on their relative phases, the beams may interfere constructively or destructively. The beam intensity vs. phase difference is shown FIG. 18. The light can then be coupled out using a similar technique as was used to input couple into the waveguide.

Normally modulators of this type show instabilities induced by their environment (e.g. temperature, stress). Since they are often used in an open loop system, light intensity control may not be adequate for all applications. One approach to deal with this problem is to carefully control the device's environment or its fabrication. This, however, may not be practical at all times or cost effective. Also, a highly non-linear function would need look-up tables to tabulate voltage values needed for a specific transmission, as well as a high degree of control during fabrication to avoid variations from device to device. Another approach is to have a closed loop, feedback system which carefully controls the light output corresponding to a signal input. This approach would also avoid calibrating periodically the curve shown in FIG. 19, as well as generating non-linear functions or look-up tables relating input voltage to light output. A block diagram of such a feedback system is shown in FIG. 19. This feedback system ensures that the output beam intensity faithfully represents the input signal. Although the detector and electronics could be implemented discretely off the modulator device, it is advantageous to have these functions in situ to the interferometer modulator. This minimizes noise problems and lead resistance, thereby increasing system SNR and bandwidth. Another obvious advantage is compactness of the integrated unit.

The device proposed integrates the modulator, detector, and feedback electronics on a single substrate, by combining silicon technology with lead lanthanum zirconate titanate (PLZT) electro-optic films.

FIG. 21 depicts a Mach-Zehnder interferometer with feedback control. Light detection is achieved on the waveguide 146 itself by incorporating a low amplitude modulation grating which scatters a small fraction of the light towards a photosensor underneath (at the silicon level). The light signal is amplified and buffered to a suitable level at 125 and compared to the input signal voltage. The voltage difference (which could be + or −) is then supplied to a feedback control element 128 which determines the signal level to be supplied to the modulator 130.

The modulator has two active regions. One set of electrodes 130 control the signal in a dynamic fashion, the other electrode 132 may be used to provide a bias voltage or static phase differential. The middle set of electrodes 134 and 136 are grounded to reference.

A requirement of the waveguide region 140 in the interferometer is that it be electro-optically active at the electrode region. Both relief channel waveguide structures may be used for this device configuration.

Input and output couplers 142 and 144 may be respectively as stated before, of the prism, grating, or butt types.

FIG. 22 shows a similar Mach-Zehnder feedback interferometer 150 along with feedback control 125. The difference in this device is the method of light detection. In this case, a directional coupler 154 is used to split a controlled fraction of the output beam to be detected. Directional couplers, such as these, achieve transfer of light across waveguides. Typical gap distances are in the micron range, while interaction distances are in the 500 micron range. The specific distances depend on the relative indices between the waveguide components, their geometry, and the fraction of coupled light desired. The rest of the device operation is similar to that of FIG. 21.

The cross section of FIG. 20 of a device such as electrode 132 of FIG. 22 shows the different layers present. In this configuration, a channel waveguide structure is used.

A transparent buffer layer, for example, silicon dioxide, tantalum oxide, and silicon nitride, layer 182 is required to avoid loss to the silicon substrate 164. Its refractive index must be lower than that of the PLT waveguide region 160. There must be holes, not shown, in this layer to allow connecting of contact pads on silicon device 164.

The PLT is divided into a high index region 160 and a low index region 166. The high index region 160 delineates the waveguide structure.

A buffer dielectric layer 168 is required between metal electrodes 170 and 172 and the waveguide film 160 to avoid loss in the region of contact. A good insulator with high dielectric constant is preferred. Examples could be $Ta_2O_5$, or PLT amorphous low index material. The requirement is that the buffer layer 168 index be lower than the PLT. Electrodes 170 and 172 are needed to supply the required signal to the modulator region. Typical metals which could be used are chromium-gold films.

The cross section in FIG. 23 is of relief waveguide device 180. This is similar to FIG. 20, except a relief waveguide is used. The index requirements in this case are as in FIG. 20. The device 180 has holes 182 in the layer 1 and 2 to allow fastening of electrode 172 to silicon device 164 by contact pads 184.

It is possible using the techniques of the invention illustrated above to form very small areas of electro-optic materials that are ajoining to optical waveguide material. In formation of such structures the precursor material is heated to form an optical waveguide material. Then a small area is heated to a higher temperature to form a crystalline electro-optic area. Although it is possible that electro-optic areas also serve as light waveguides, there is an advantage in only having a small area where the electro-optic properties are needed within a larger optical waveguide. The advantage is that the optical waveguide has a low loss of light compared with the polycrystalline electro-optic material which has a greater light loss as light travels through it. Therefore, it is possible by use of the laser or imprinting technique to form a small area of electro-optic material that will function for electro-optical properties, such as modulation connections without the loss of light strength that would take place if the entire light path was electro-optic. Illustrated in FIGS. 24 and 25 is the waveguide pattern for a Mach-Zehnder-type interferometer. Illustrated in FIG. 24 is a plan view of member 190 on which an optical waveguide pattern 192 has been formed by low temperature patterned heating. Only in areas 194 and 196 the heating has been carried out at high enough temperature to crystallize the material forming in an electro-optic waveguide. As illustrated in the partial cross-sectional view of FIG. 25, the electro-optic waveguide 196 is bounded by electro-optic areas 192. The electro-optic material rests on a insulated layer 198 which in turn rests upon a high temperature base 200. The techniques of the invention as they allow the pinpoint formation of high temperature electro-optic areas are particularly useful for structures, such as optical waveguides that require at least a small area of electro-optic property.

The following examples illustrate the performance of the invention. Parts and percentages are by weight unless otherwise indicated.

EXAMPLES

EXAMPLES 1-4

Preparation of PLZT 28/0/100 Films

PLZT 28/0/100 is a lanthanum modified $PbTiO_3$ in which 28% of the Pb is replaced with La. A PLZT 28/0/100 film is produced on the substrate surface by the decomposition of a metallo-organic precursor solution. The coated solution is fired to a temperature insufficient to cause crystallization or complete densification in the film. If the film were fully thermally processed, the PLZT film would crystallize in a randomly oriented perovskite structure or a preferentially oriented perovskite structure, depending on substrate choice. Perovskite films have electro-optical properties. Instead, the thermal processing is halted at an early stage and completed to obtain electro-optic properties using some localized heating method, e.g., $CO_2$ laser as set forth below. In this way, a patterning in the layer can be achieved.

EXAMPLE 1

A coating composition is prepared by dissolving the Pb, Ti, and La metallo-organics in a solvent(s) according to the following formulation: 0.173 g lanthanum acetate hydrate is mixed with 0.691 g 2-ethylhexanoic acid. The two compounds are refluxed until no solid La acetate remains. During the refluxing a transcarboxylation of acetate to 2-ethylhexanoate occurs with liberation of acetic acid. The result is a clear solution of La carboxylate in 2-ethylhaxanoic acid (with some minor residual of acetic acid).

To the above solution add: 1.0 g Engelhard Pb base metal resinate 1.15 g Engelhard Ti base metal resinate.

This formulation is a stable solution having the desired cation distribution for PLZT 28/0/100.

The solution prepared above is spin-coated onto a fused quartz disk. A spin speed of 5,000 rpm and a spin time of 20 seconds are employed. The film is baked for 10 minutes at 100° C. and then fired on a hot plate for 10 minutes at 330° C. The fired film has a thickness of 6,000 Å and has an amorphous crystal structure.

Laser Patterning

A Laser Engineering Model J-35 $CO_2$ laser is made to irradiate the film described in Example 1; film preparation. The sample is located 15 inches from the laser exit port with film side toward the laser. The laser beam is unfocused. Power level is 15 watts and irradiance at sample is 120 w/cm$^2$. The sample is translated across the beam at a rate of 3 nm/sec.

The 10.6 μm radiation from the laser is highly absorbed by the fused quartz substrate and rapidly heats the film. The localized heating where the beam intersects the film causes the complete thermal processing of the film in the area of localized heating. Thus the laser written regions have been converted to a material of higher density and higher refractive index than the unirradiated regions of the film. Furthermore, the irradiated material has undergone a phase change from the amorphous to polycrystalline perovskite crystal structure as was observed by x-ray diffraction.

The laser irradiation technique described above, therefore, is capable of producing conditions suitable for channel waveguides. By focusing the laser writing beam, it would be possible to pattern much finer structures than discussed in the above example.

EXAMPLE 2

Preparation of PLZT 28/0/100 on Glass

Film preparation is approximately that described in Example 1 with the exception that Kodak Slide Cover glass, Cat. 141 3020, was used as a substrate.

Laser Patterning

Laser Patterning was carried out as described in Example 1.

EXAMPLE 3

Preparation of PLZT 28/0/100 on an SiO$_2$

Film on a Silicon Substrate

Film preparation is as described in Example 1, except that the La precursor is La(fod)$_3$. The substrate in Example 3 is single crystal (100) silicon onto which is deposited a 1500 Å layer of SiO$_2$. The SiO$_2$ deposition is done by CVD (Chemical Vapor Deposition) but any other process, such as metallo-organic decomposition, may be suitable.

Laser Patterning

Laser Patterning is carried out as described in Example 1.

EXAMPLE 4

Film Preparation

A PLZT 28/0/100 film is prepared as given in Example 3 except that a substrate of 1$\bar{1}$02 oriented sapphire (2" diameter) is used. After the 330° C. heat treatment, the film is largely inorganic and amorphous in structure. A metal tool having the desired waveguide/modulator geometry is then heated such that its surface temperature was raised to 500° C. from room temperature. The PLZT 28/0/100 film is then pressed against the tool with the film side towards the hot surface. In some cases it may be desirable to heat the film from the substrate side by placing the substrate on the heated tool. Placing the film directly on the heated tool, however, provides the sharpest annealed patterns.

After 5 minutes at 500° C., the film is removed from the heated tool. It is found that this heat treatment induced the film to crystallize to a 110 oriented perovskite structure replicating the pattern of the tool. Heating time has been found to be critical and can depend on the topography of the tool. If the tool is not pressed for a long enough time interval, the film may not crystallize, whereas if it is left for too long, the pattern may be blurred or lost due to thermal conduction. The pattern of the tool can be made to delineate high index regions (e.g., waveguides) or areas where high dielectric constants or high electro-optic coefficients are desired.

EXAMPLES 5-10

Preparation of PZT 53/47 Films

PZT 53/47 is a zirconium-modified PbTiO$_3$ in which there is a 53/47 ratio of Zr/Ti in the crystal structure. This composition is useful because of its electro-optic, ferroelectric, and piezoelectric properties. PZT thin films are prepared and processed using techniques such as those described in Examples 1-4.

EXAMPLE 5

A coating composition of PZT 53/47 is prepared by dissolving Pb, Zr, and Ti metallo-organics according to the following formulation: Engelhard Zr-based metal resinate=0.472 g, Engelhard Ti-based metal resinate=0.452 g, Engelhard Pb-based metal resinate=1.076 g, and toluene=0.25 g.

The solution is spin-coated onto a fused SiO$_2$ substrate by flooding the formulation onto the disk and subsequently spinning it at 5000 rpm for 30 seconds. The film is heated from room temperature up to 300° C. for six hours. The film is then allowed to cool to room temperature. Two additional layers are deposited using the same procedure to achieve a total film thickness of approximately 7600 Å.

The PZT film is then heated at 370° C. for five minutes on a hot plate and allowed to cool to room temperature. Measurement of the film's refractive index reveals n=1.53 at a wavelength of 633 nm. Another PZT film is heated at approximately 540° C. for five minutes. A substantial increase in the refractive index is measured. The refractive index of the higher temperature film is found to be 2.16 at a wavelength of 633 nm.

Laser patterning using a CO$_2$ laser as described in Example 1 is carried out on the 300° C. treated PZT film. A similar increase of the refractive index as achieved with the 540° C. thermal treatment is noted, and the laser-treated area has electro-optic properties.

EXAMPLE 6

Control

A thin film of 53/47 PZT precursor prepared as described in Example 5 is deposited on a single crystal sapphire 1$\bar{1}$02 2" diameter wafer. The film is heated from room temperature to 540° C. and allowed to sit at that temperature for one hour. The resulting film had a thickness of 2200 Å and a refractive index of n=1.92 at a wavelength of 633 nm. X-ray diffraction showed the film to be partly crystallized but highly oriented in the 110 direction.

Another PZT film is heated from room temperature to 650° C. and processed at that temperature for one hour. The resulting film has a thickness of 2000 Å and a refractive index of 2.39. X-ray diffraction shows a highly 110 oriented perovskite structure but more fully crystallized than the lower temperature film. Some degree of densification is also observed. This example illustrates the low and high temperature properties of the materials utilized in Example 5.

EXAMPLE 7

A 53/47 PZT precursor prepared as described in Example 5 is spin-coated at 5000 rpm for 30 seconds on a one-inch diameter fused $SiO_2$ substrate. The film is fired to approximately 325° C. for five minutes. At this point, a 3000 Å thick, largely inorganic amorphous film is obtained.

The film is then overcoated by flooding the substrate with KTI 809 (brand name) photoresist and spin-coating the disk at 5000 rpm for 30 seconds. The resist is prebaked at 90° C. for 30 minutes and exposed with an Oriel Co. UV light source/timer Model 8160 operated at 65 volts/7.7 A through an optical mask for 20 seconds. The resist pattern is developed using Kodak ® 809 Low Metal Ion Developer (brand name) for about 20 seconds, rinsed and dried.

This procedure results in a patterned photoresist layer, which replicated the optical mask pattern. The substrate was then submerged in Transene TFTN Ti etchant for approximately 120 seconds. This procedure completely removed the PZT film where it was not covered by the photoresist. The photoresist was then removed from the underlying PZT pattern using an organic solvent, such as acetone, to result in a patterned PZT film, which replicated the original optical mask pattern. It is critical to start with an amorphous PZT film, since it becomes quite insoluble when crystallized. A crystalline structure of the patterned film is obtained when the amorphous film is heated.

EXAMPLE 8

A layer of PZT 53/47 is deposited onto a fused $SiO_2$ wafer and processed at 300° C. for six hours as described in Example 5. Laser patterning using a $CO_2$ laser as described in Example 1 is then carried out. The laser-processed sample is then submerged in Transene TFTN Ti etchant for approximately 10 minutes. This procedure completely removed the PZT film where it was not laser annealed. The resulting pattern is a set of ribs representing the original tracks produced by the $CO_2$ laser beam.

EXAMPLE 9

A Zr-Ti oxide glass film is prepared having a Zr/Ti ratio of 53/47. This compound tends to form a glass at our standard processing temperatures. The substrate in this Example was a 2" diameter $1\bar{1}02$ oriented sapphire wafer. A coating composition was prepared by dissolving Zr and Ti, metallo-organics according to the following formulation: Engelhard Zr-based metal resinate=0.472 g, Engelhard Ti-based metal resinate=0.452 g, and toluene=0.25 g.

The solution is spin-coated on the $1\bar{1}02$ oriented sapphire substrate by flooding the formulation onto the disk and spinning at 5000 rpm for 20 seconds. The film is fired to 450° C. and held at that temperature for 10 minutes. X-ray diffraction showed primarily an amorphous morphology.

Next, the film was overcoated with an Engelhard lead metallo-organic compound diluted in toluene 50:50 by weight.

The precursor is spin-coated over the Zr-Ti oxide at 5000 rpm for 20 seconds. The metallo-organic solution is then selectively removed with toluene to achieve a desired film pattern.

The Pb film is fired at 650° C. and held at that temperature for one hour to achieve in-diffusion. X-ray energy dispersive analysis shows that the film has incorporated the Pb, although it was still somewhat Pb deficient. X-ray diffraction of the film showed the desired perovskite structure. Optical absorption measurements also indicated strong absorption at 370 nm, typical of PZT perovskite compounds.

Pb metallo-organic solution may also be painted through a stencil to generate various patterns. Other deposition techniques, such as screen printing or ink jet deposition, may be used to produce the desired pattern.

EXAMPLE 10

A 53/47 450 C-treated ZT film as prepared in Example 9 is placed in a sealed $Al_2O_3$ crucible containing PbO powder and then is heated to 650° C. Since PbO exhibits significant vapor pressure at 650° C., there is PbO vapor within the sealed crucible. After one hour of heat treatment, PbO diffused into the ZT film is evidenced by X-ray dispersive analysis and optical absorption. A mechanical mask made of a bare sapphire wafer is used to protect certain regions of the ZT film from the Pb vapor. Regions below the mask are effectively shielded and Pb deficient. Higher resolutions may be achieved by using patterned films of diffusion barriers such as $Si_3N_4$.

EXAMPLES 11-14

Preparation of a PLZT 28/0/100 film on a film of silicon nitride on a silicon substrate PLZT 28/0/100 is a lanthanum modified lead titanate in which 28% of the Pb is replaced by La. The substrate is a wafer of single crystal (100) silicon on which is deposited a layer of silicon nitride by CVD. The PLZT film crystallizes on the above in a randomly oriented polycrystalline perovskite structure.

EXAMPLE 11

A precursor solution is prepared by combining Pb, Ti, and La metallo-organics with toluene according to the following formulation:

| | |
|---|---|
| Engelhard Pb base metal resinate | 1.0 g |
| Engelhard Ti base metal resinate | 1.15 g |
| Tris (1,1,1,3,3,-heptafluoro-7,7-dimethyl 4,6-octanedionate) lanthanum hydrate | .545 g |
| Toluene | .1 g |

These constituents mix to form a stable solution having the desired cation stoichiometry for PLZT 28/0/100.

The above precursor solution is spun onto the silicon nitride coated silicon substrate at 4000 rpm for 20 seconds. The film is baked at 100° C. for five minutes. The film is then subjected to laser treatment as in Example 1 to produce an inorganic electro-optic waveguide of PLZT 28/0/100. The waveguide is 4000 Å thick and shows randomly oriented polycrystalline perovskite structure by x-ray diffraction analysis.

Additional films for Examples 12, 13, and 14 were prepared by the procedures outlined in Example 11 having the compositions and properties indicated in Table 1.

TABLE 1

| Example | 11 | 12 | 13 | 14 |
|---|---|---|---|---|
| Composition | | | | |
| Pb | .532 | .532 | .532 | .532 |
| La | .139 | .139 | .139 | .139 |
| Ti | .159 | .159 | .159 | .159 |
| O | .171 | .171 | .171 | .171 |
| Precursor Composition | | | | |
| Engelhard Pb base metal resinate (g) | 1.0 | 1.0 | 1.0 | 1.0 |
| Engelhard Ti base metal resinate (g) | 1.15 | 1.15 | 1.15 | 1.15 |
| La (fod)$_3$ | .545 | .545 | .545 | — |
| La Acetate | — | — | — | .173 |
| 2-ethylhexanoic acid | — | — | — | .691 |
| Toluene | .1 g | .1 g | .1 g | — |
| Film Preparation | | | | |
| Substrate | Si$_3$N$_4$(1100Å)/Si | Si$_3$N$_4$(2000Å)/GaAs | SiO$_2$(2000Å)/Si | SiO$_2$(2000Å)/GaAs |
| Subs. Orientation | amorphous/100 | amorphous/100 | amorphous/100 | amorphous/100 |
| Spin speed (rpm) | 4000 | 4000 | 2000 | 4000 |
| Spin time (sec) | 20 | 20 | 20 | 20 |
| Bake temp (°C.) | 90 | 100 | 100 | 100 |
| Bake time (min) | 5 | 5 | 5 | 5 |
| Fire temp (°C.) | 500 | 500 | 450 | 470 |
| Fire time (min) | 5 | 5 | 5 | 5 |
| Atmosphere | air | air | air | air |
| Results | | | | |
| Example | 1 | 2 | 3 | 4 |
| Film thickness | 4000 | 4000 | 5000 | 6500 |
| Crystallinity | polycryst perkovskite | polycryst perkovskite | polycryst perkovskite | polycryst perkovskite |

The invention has been described with reference to preferred embodiments. However, it is understood that other variations and embodiments of the invention may be performed. The invention is only intended to be limited by the breadth of the claims attached hereto.

We claim:

1. A method of forming a crystalline ceramic comprising casting a layer of metallo-organic ceramic precursor of electro-optic, ferroelectric or piezoelectric material onto a base and performing a localized heating of a portion of said layer with a heated imprinting tool to create a patterned area of crystalline ceramic.

2. The method of claim 1 wherein said layer is heated to create an amorphous substantially inorganic ceramic prior to said localized heating.

3. The method of claim 2 wherein said localized heating changes said portion of said amorphous ceramic to polycrystalline ceramic.

4. The method of claim 2 wherein said heating to create said amorphous ceramic is in a pattern.

5. The method of claim 6 wherein the layer portion not in the pattern of amorphous ceramic is removed and the said pattern of amorphous ceramic is subjected to heating to create said electro-optic polycrystalline ceramic.

6. The method of claim 7 wherein the removed non-pattern portion is removed by a solvent solution.

7. The method of claim 3 wherein prior to said heating of a portion a material which can reactively in-diffuse a lead specie to form a crystalline electro-optic material is coated onto said layer.

8. The method of claim 7 wherein during said heating of a portion, said electro-optic in-diffusion material combines with said layer to form electro-optic material.

9. The method of claim 2 wherein said amorphous ceramic forms an optical waveguide.

10. The method of claim 3 wherein said heating of a portion forms an electro-optic waveguide in a pattern.

11. The method of claim 1 wherein said polycrystalline ceramic consists essentially of one or a mixture of lanthanum modified lead zirconate titanate, lead zirconate titanate, lead lanthanum titanate, barium lanthanum titanium niobate, barium titanate, lithium niobate, or lithium tantalate.

12. The method of claim 1 wherein said base material is selected from the group consisting essentially of fused quartz, sapphire, magnesium oxide, and strontium titanate.

13. The method of claim 1 wherein said metallo-organic materials comprise metal carboxylates dissolved in a solvent.

14. The method of claim 1 wherein said casting comprises spin-coating.

15. The method of claim 1 wherein prior to casting of the layer of metallo-organic ceramic precursor a dielectric layer is formed on said base.

16. The method of claim 15 wherein said dielectric layer comprises silicon nitride.

17. The method of claim 15 wherein the material forming said dielectric layer is selected from the group consisting essentially of Si$_3$N$_4$, SiO$_2$, Ta$_2$O$_3$, ZrO$_2$, and mixtures thereof.

18. The method of claim 15 wherein said polycrystalline ceramic comprises lead zirconium titanate.

19. The method of claim 15 wherein said base comprises silicon or gallium arsenide.

20. The method of claim 15 wherein said base comprises a material selected from the group consisting of fused quartz, sapphire, magnesium oxide, and strontium titanate.

21. A method of forming a crystalline ceramic comprising casting a layer of metallo-organic ceramic precursor of electro-optic, ferroelectric or piezoelectric material onto a base, heating said layer of precursor to decompose said precursor to form an amorphous ceramic layer, partially overcoating the amorphous ceramic layer with a barrier layer thereby forming a diffusion mask and treating in a gaseous atmosphere of reactive lead containing vapor in-diffusion agent to create crystalline ceramic in areas not overcoated with said diffusion mask.

22. The method of claim 21 wherein said in-diffusion agent changes at least a portion of said amorphous ceramic to crystalline ceramic.

23. The method of claim 21 wherein said partial overcoating is in a pattern.

24. The method of claim 21 wherein the layer portion not coated with said barrier layer is removed after said treating in a gaseous atmosphere.

25. The method of claim 24 wherein the removed non-pattern portion is removed by a solvent solution.

26. The method of claim 22 wherein prior to said treating in a gaseous atmosphere a material which can reactively in-diffuse a lead specie to form a crystalline electro-optic material is coated onto said layer.

27. The method of claim 26 wherein during said treating in a gaseous atmosphere said in-diffusion material combines with said layer to form electro-optic material.

28. The method of claim 21 wherein said amorphous ceramic forms an optical waveguide.

29. The method of claim 22 wherein the vapor treatment of portion forms an electro-optic waveguide in a pattern.

30. The method of claim 21 wherein said crystalline ceramic consists essentially of one or a mixture of lanthanum modified lead zirconate titanate, lead zirconate titanate, lead lanthanum titanate, barium lanthanum titanium niobate, barium titanate, lithium niobate, or lithium tantalate.

31. The method of claim 21 wherein said base material is selected from the group consisting essentially of fused quartz, sapphire, magnesium oxide, and strontium titanate.

32. The method of claim 21 wherein said metallic-organo materials comprise metal carboxylates dissolved in a solvent.

33. The method of claim 21 wherein said casting comprises spin-coating.

34. The method of claim 21 wherein prior to casting of the layer of metallo-organic ceramic precursor a dielectric layer is formed on said base.

35. The method of claim 34 wherein said dielectric layer comprises silicon nitride.

36. The method of claim 34 wherein the material forming said dielectric layer is selected from the group consisting essentially of $Si_3N_4$, $SiO_2$, $Ta_2O_3$, $ZrO_2$, and mixtures thereof.

37. The method of claim 34 wherein said polycrystalline ceramic comprises lead zirconium titanate.

38. The method of claim 34 wherein said base comprises silicon or gallium arsenide.

39. A method of forming a crystalline ceramic comprising casting a layer of metallo-organic ceramic precursor of electro-optic, ferroelectric or piezoelectric material onto a base, heating said layer to create an amorphous substantially inorganic ceramic, depositing a pattern of areas of indiffusion material, and heating said amorphous layer and indiffusion material to create areas of electro-optic, ferroelectric, or piezoelectric crystalline ceramic in the pattern of said indiffusion materials.

40. The method of claim 39 wherein the removed non-pattern portion is removed by a solvent solution.

41. The method of claim 39 wherein said metallo-organic materials comprise metal carboxylates dissolved in a solvent.

42. The method of claim 39 wherein said casting comprises spin-coating.

43. The method of claim 39 wherein said crystalline ceramic consists essentially of one or a mixture of lanthanum modified lead zirconate titanate, lead zirconate titanate, lead lanthanum titanate, barium lanthanum titanium niobate, barium titanate, lithium niobate, or lithium tantalate.

44. The method of claim 39 wherein said base material is selected from the group consisting essentially of fused quartz, sapphire, magnesium oxide, and strontium titanate.

45. A method of forming a ceramic comprising casting a layer of metallo-organic ceramic precursor of electro-optic, ferroelectric or piezoelectric material onto a base, heating the precursor layer to form an amorphous layer, and then performing a localized patterned heating of a portion of said amorphous layer to create a patterned area of electro-optic waveguide or ferroelectric ceramic.

46. The method of claim 45 wherein said localized heating is accomplished with a laser.

47. The method of claim 45 wherein the localized heating is in a pattern.

48. The method of claim 45 wherein said crystalline ceramic consists essentially of one or a mixture of lanthanum modified lead zirconate titanate, lead zirconate titanate, lead lanthanum titanate, barium lanthanum titanium niobate, barium titanate, lithium niobate, or lithium tantalate.

49. The method of claim 48 wherein said base material is selected from the group consisting essentially of fused quartz, sapphire, magnesium oxide, and strontium titanate.

50. The method of claim 45 wherein said metallo-organic materials comprise metal carboxylates dissolved in a solvent.

51. The method of claim 45 wherein said casting comprises spin-coating.

* * * * *

UNITED STATES PATENT AND TRADEMARK OFFICE
CERTIFICATE OF CORRECTION

PATENT NO. : 5,064,684
DATED : November 12, 1991
INVENTOR(S) : Jose M. Mir, et. al.

It is certified that error appears in the above-indentified patent and that said Letters Patent is hereby corrected as shown below:

On the Title page, item [56] under References Cited/Foreign Patent Documents -- "54-033107" should read --79-033107--.

Column 13, line 51, "6" should read --4--.

Column 13, line 65, "7" should read --5--.

Signed and Sealed this

Seventh Day of September, 1993

Attest:

BRUCE LEHMAN

Attesting Officer

Commissioner of Patents and Trademarks